(12) United States Patent
Meissner

(10) Patent No.: US 6,936,373 B2
(45) Date of Patent: Aug. 30, 2005

(54) MONOBLOC BATTERY HAVING A NUMBER OF INTERCONNECTED ELECTROCHEMICAL CELLS

(75) Inventor: Eberhard Meissner, Wunstorf (DE)

(73) Assignee: VB Autobatterie GmbH, Hannover (DE)

( * ) Notice: Subject to any disclaimer, the term of this patent is extended or adjusted under 35 U.S.C. 154(b) by 430 days.

(21) Appl. No.: 10/233,533

(22) Filed: Sep. 4, 2002

(65) Prior Publication Data
US 2003/0042869 A1 Mar. 6, 2003

(30) Foreign Application Priority Data
Sep. 6, 2001 (DE) .......................... 101 43 632

(51) Int. Cl.⁷ ................................ H01M 2/12
(52) U.S. Cl. ...................... 429/88; 429/53; 429/87; 429/156; 429/204
(58) Field of Search ...................... 429/82, 87, 88, 429/204, 53, 156

(56) References Cited

U.S. PATENT DOCUMENTS

| | | | | |
|---|---|---|---|---|
| 4,529,674 A | * | 7/1985 | Brooks | 429/71 |
| 6,025,086 A | * | 2/2000 | Ching | 429/82 |

FOREIGN PATENT DOCUMENTS

| | | |
|---|---|---|
| DE | 34 25 169 C2 | 1/1986 |
| DE | 197 51 987 A1 | 5/1999 |
| DE | 198 10 746 A1 | 9/1999 |
| EP | 0 939 475 A2 | 9/1999 |

OTHER PUBLICATIONS

Siedle, Christoph, *Vergleichende Untersuchung von Ladungsausgleichseinrichtungen zur Verbesserung des Langzeitverhaltens vielzelliger Batteriebänke*, Karlsruhe University, Dec. 1997, VDI Progress Reports, Series 21/Electrical Engineering, No. 245, VDI–Press Düsseldorf 1998, no month.

Ehlers, Karsten et al., *42 V—an indication for changing requirements on the vehicle electrical system*, Jorunal of Power Sources 95 (2001), pp. 43–57, no month.

* cited by examiner

Primary Examiner—John S. Maples
(74) Attorney, Agent, or Firm—Foley & Lardner LLP

(57) ABSTRACT

A monobloc battery including a plurality of interconnected electrochemical cells formed from electrodes and electrolyte and having end poles, wherein distances between selected cells and the end poles and, optionally, distances between the selected cells, are set such that no voltages of more than about 30V occur between the distances under normal operating conditions of the monobloc battery, and at least one gas collecting line connected to selected cells and located to collect explosive gas mixtures, if any, generated by the cells, the gas collecting line being substantially electrically insulating and, in at least one area, having a lining composed of an electron-conductive material electrically conductively contacting the electrodes or the electrolyte in an individual cell.

12 Claims, 3 Drawing Sheets

MONOBLOC BATTERY HAVING A NUMBER OF INTERCONNECTED ELECTROCHEMICAL CELLS

RELATED APPLICATIONS

This application claims priority of German Patent Application No. DE 101 43 632.7, filed Sep. 6, 2001.

FIELD OF THE INVENTION

This invention relates to a monobloc battery having a number of interconnected electrochemical cells and having at least one gas collecting line, which is common to a number of cells and in which explosive gas mixtures may be located.

BACKGROUND

In many cases, electrochemical storage cells are combined into so-called "monobloc batteries", also referred to as "monoblocs". These generally comprise physically identical rechargeable battery cells, which have the same capacity and are arranged in a common monobloc box, being connected in series. Their combination in a common housing firstly makes them easier to handle while, secondly, they can be produced at a lower cost and have a higher weight-related and volume-related energy density, due to the saving of material and due to the reduction in the number of individual parts.

Monobloc batteries such as these are normal, for example, in lead-acid rechargeable batteries. Monobloc batteries such as these are known for stationary applications, for example, in telecommunications and for emergency power supply facilities. In the case of lead-acid rechargeable batteries such as those used as starter batteries for vehicles, six identical cells are frequently connected in series, thus resulting in a block with a rated voltage of 12V. However, for stationary battery systems, monobloc batteries with only 2, 3, 5 or else a different number of cells connected in series are also normal.

However, monobloc batteries are used not only for lead-acid rechargeable batteries, but also for alkaline rechargeable batteries with the electrochemical systems nickel/cadmium, nickel/metal hydride, nickel/iron as well as for lithium-ion rechargeable batteries.

Depending on the nature of the electrochemical system, a certain amount of gases can be produced in rechargeable batteries when being used correctly and in extreme operating states. Such gases are emitted to the environment through an opening provided in the cell. These gases are primarily oxygen or hydrogen, or a mixture of these two gases, although the gas mixture may also contain other substances. The amount of gas developed depends on the type of electrochemical system, the nature and the operating conditions.

In the case of so-called "open rechargeable battery systems", it is normal to produce a connection which is always open from the interior of the cell to the environmental air, into which precipitation devices such as baffle plates, frits or the like can be installed to reduce the emission of liquid droplets.

Sealed rechargeable batteries, on the other hand, are designed such that no gases, or only very small amounts of gases, are developed in the cell interior during normal operating conditions. For this reason, no excess pressure, or only a very small excess pressure, is built up inside the cells, and the connection between the cell interior and the environment is generally sealed by a nonreturn valve. This opens only when a certain excess pressure has occurred in the cell interior, and closes off the cell interior from the air surrounding the cell once again, in a sealed manner, once the excess pressure has been compensated for.

The gases formed in the interior of the cell may be combustible, depending on the nature and operating conditions, and in the case of a disadvantageous mixture ratio of oxygen and hydrogen, may even be directly explosive. For this reason, in many cases, the gas leaving individual cells is not emitted directly to the environment, but is collected in a gas collecting line which connects degassing openings of the individual cells in the monobloc battery, and is emitted from the monobloc battery to the environment from a single opening (or else, for redundancy reasons, from two openings). In order to avoid the collection of explosive gas mixtures, in, for example, a motor vehicle in which the starter battery is arranged in an area that is closed in a relatively sealed manner, a hose may be connected to this opening or to these openings, through which the gases which are developed are passed to the open air.

This procedure is not only normal for open and closed rechargeable batteries, but is also used for sealed rechargeable batteries.

The gas collecting lines are used to safely dissipate combustible gases or gas mixtures which may be developed from the area surrounding the monobloc rechargeable battery. In this case, it is very important to safely avoid detonation of the gases. The critical factor in this case is, in particular, flashbacks from flames or sparks outside the monobloc battery through the gas collecting line into the interior of the monobloc rechargeable battery. This is normally avoided by the installation of frits, composed of porous sintered plastic or gas, at the outlet of the gas collecting line to the environment.

These gas collecting lines are normally dry, that is to say, they are not wetted with electrolyte from the cells in the monobloc battery. The wall of the gas collecting lines is, thus, electrically decoupled from the cells since the material of the monobloc battery is generally an electrical insulator, in the same way as that of the gas collecting lines. The inner wall of the gas collecting lines is, thus, at an undefined potential and there are no high field strengths resulting from the voltage of the rechargeable battery cells.

However, the situation changes if the inner wall of the gas collecting line is wetted by electrolyte from one or more of the cells. In this case, a greater or lesser extent of electrolytic coupling occurs to one or more cells. If coupling occurs to a number of the series-connected individual cells, then an ionic current flows via this electrolytic wetting film on the common gas collecting line, since the series-connected cells are actually at different potentials. This ionic current results in an irreversible material transfer from one cell to the other, and to a discharge between the cells affected and the cells located in between them.

Ionic currents through the common gas collecting line are, therefore, parasitic currents, and must as far as possible be prevented. This is done by means of a gas collecting line design which is as long as possible and avoids permeating wetting with electrolyte, not only for the supply line from the individual cells to the gas collecting line, but also through the gas collecting line being routed over as long a distance as possible.

The ionic current which may flow from one cell to the others through the gas collecting line that has been wetted with electrolyte can lead to electrolysis of the water contained in the electrolyte film. As a consequence, the electrolyte film may be interrupted at specific points, so that very high field strengths may occur locally. If the field strength is sufficient, a flashover can occur, which may cause detonation of any explosive gas mixture which may be present at this point. The precise level of these field strengths is highly random and virtually unpredictable, although it has been found from experience that, if the voltages are less than 30 volts, there is generally no risk of detonation of the gas mixture that is located in a gas collecting line.

Where higher voltage differences are possible between cells which are connected to a common gas collecting line, it is possible, on the other hand, for an explosive gas mixture to be detonated. This is described and explained in German Patent Specification 3,425,169. In order to overcome the risk of detonation, this Patent Specification describes a method in which alternately insulating and metallically conductive sections are arranged in the gas dissipation system. The metallically conductive sections are connected to one another by means of electronic switching elements, namely simply by non-reactive resistors or, in an improved embodiment, by zener diodes. This limits the voltage difference between adjacent metallically conductive sections.

Furthermore, FIG. 2 of DE-C 3,425,169 indicates the connection of that metallically conductive section which is closest to the positive pole being connected to the positive pole.

This method is particularly suitable for large battery systems, such as those which are used in submersible vehicles. In this case it is normal to collect charging gases that are developed in the individual cells in a common dissipation system. In this case, cells which may have voltage differences of several hundred volts between them are connected to one another. A similar situation occurs in large fuel cell units, whose exhaust gas lines are likewise connected, and where, once again, voltages of several hundred volts, may occur. However, the measures described in German Patent Specification 3,425,169 are comparatively complex, since they require sections of metallically conductive dissipation channels and electronic circuitry.

In monobloc batteries in which sufficiently few electrochemical cells are interconnected that it is impossible to reach a voltage that is sufficient for detonation of an explosive gas mixture, in any operating conditions, in a degassing system that is provided, there is no need for any special precautionary measures. This applies in particular to lead-acid rechargeable batteries with a rated voltage of 12V, such as those which are used in conventional present-day starter batteries in motor vehicles, which are in general not subjected to voltages of more than 18V, even in extreme conditions.

Concepts for novel power supply system networks for use in motor vehicles envisage that the currently normal operating voltage for the electrical components of about 14V will be raised to a new voltage level of about 42V. This application requires batteries whose rated voltage is about 36V. If these are lead-acid rechargeable batteries, then charging voltages of up to about 48V must be provided in this case.

International specialist committees are currently considering draft standards for the voltage level in such new vehicle power supply system networks, which envisage operating voltages of up to 48V with positive half-cycle peaks of up to 50V. Furthermore, in exceptional cases, voltage peaks of up to 50V are permissible (see K. Ehlers, H.-D. Hartmann, E. Meissner, Journal of Power Sources 95 (2001) 43).

Batteries for these new concepts for electrical power supplies for motor vehicles may be composed of a number of monobloc batteries with an appropriate rated voltage. When, for example, two monobloc batteries each having a rated voltage of 18V are used, then it would actually be possible to reach a voltage value that is critical for detonation, in the event of an asymmetric distribution of the voltage between the two monobloc batteries, when using a vehicle power supply system network voltage with a maximum of 58V.

If three monobloc batteries with a rated voltage of 12V each are connected in series, then voltages in an individual block of more than 30V can be achieved only with an extremely non-uniform voltage distribution, for example, in the event of a defect in one of the blocks. There is, thus, no need to be concerned about any risks resulting from detonation in a gas collecting line in the individual blocks in this case, provided that these systems of the individual blocks are not connected to one another.

However, if there is an aim to provide a battery for this vehicle power supply system network in a single monobloc battery, then the voltage in the gas collecting line in this monobloc battery will undoubtedly exceed the threshold values which are critical for detonation, if a single gas collecting line is provided, that is used for all the cells. The same is true of the gas collecting lines of a number of series-connected monobloc batteries, which each have only a low rated voltage, are connected, thus resulting in a gas dissipation system with an overall voltage which may be critically high overall.

It is also possible to provide a number of separate gas collecting lines with physically and electrically separated outlets to the environment in a monobloc battery, so that the voltage on each of them remains below the possibly critical value of 30V with the voltage conditions that can be assumed. However, this necessitates each of these outlets having its own frit to avoid backflashes from the exterior. However, this increases costs. If there is also an aim of fitting flexible tubes to the outlets of the rechargeable battery, to dissipate the gases that are developed further, then a number of outlets, with separate flexible tubes, must be provided. This considerably increases the risk of incorrect fitting, especially after replacement of the rechargeable battery.

It would, therefore, be advantageous to provide a simple and low-cost procedure in order to avoid the risk of detonation of the explosive gas mixtures in gas collecting lines in monobloc batteries, where the gas collecting lines connect cells to one another which can reach an overall voltage of more than 30 volts with respect to one another during operation, and which are used in particular in monobloc batteries with a comparatively low rated voltage (such as a rated voltage of 42V for a motor vehicle power supply system network).

This is equivalent to interconnections of a number of monobloc batteries with a relatively low rated voltage with their respective gas collecting lines connecting in series, in which case, although no critically high voltages occur in the gas collecting line of each individual monobloc battery, such voltages do, however, occur in the overall degassing system that results from the connection of the gas collecting lines.

SUMMARY OF THE INVENTION

This invention relates to a monobloc battery including a plurality of interconnected electrochemical cells formed from electrodes and electrolyte and having end poles, wherein distances between selected cells and the end poles and, optionally, distances between the selected cells, are set such that no voltages of more than about 30V occur between the distances under normal operating conditions of the monobloc battery, and at least one gas collecting line connected to selected cells and located to collect explosive gas mixtures, if any, generated by the cells, the gas collecting line being substantially electrically insulating and, in at least one area, having a lining composed of an electron-conductive material electrically conductively contacting the electrodes or the electrolyte in an individual cell.

BRIEF DESCRIPTION OF THE DRAWINGS

The subject matter of the invention will be explained in more detail in the following text with reference to FIGS. 1 to 6.

DETAILED DESCRIPTION

Figure 1:
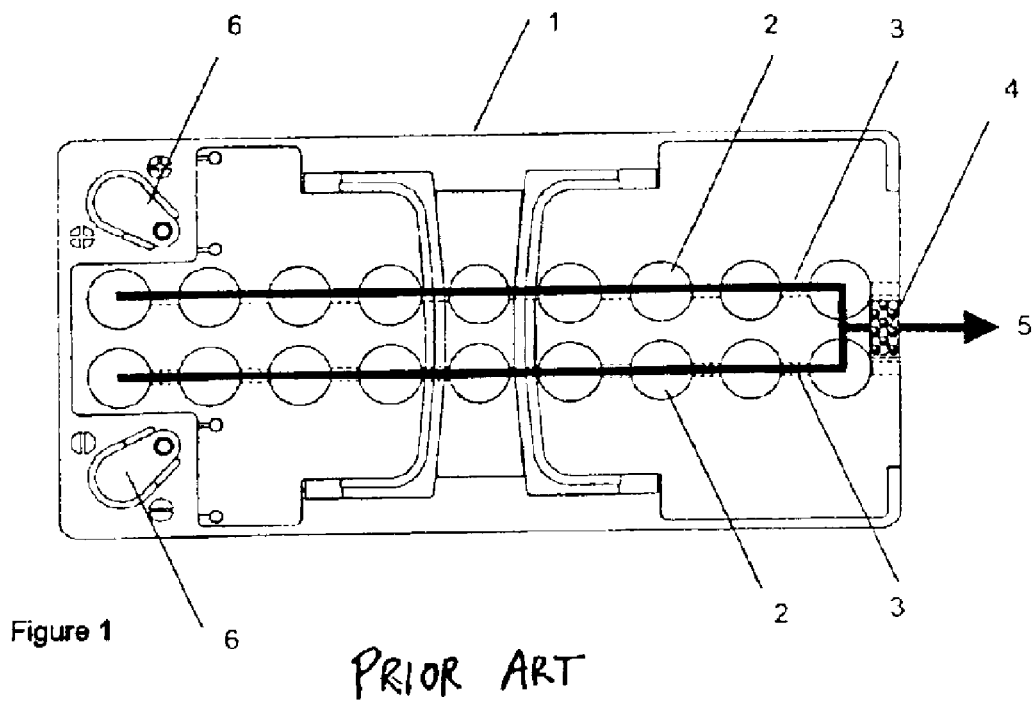
FIGS. 1 to 2 show, schematically, top plan views of an arrangement of gas collecting lines on a monobloc battery according to the prior art.

It will be appreciated that the following description is intended to refer to specific embodiments of the invention selected for illustration in the drawings and is not intended to define or limit the invention, other than in the appended claims.

In one monobloc battery according to aspects of the invention, with a gas collecting line which is common to a number of cells and in which explosive gas mixtures may be located, the inner wall of this gas collecting line is designed to be essentially electrically insulating and, in at least one area, has a lining composed of an electron-conductive material, which makes electrically conductive contact with electrodes or the electrolyte in an individual cell, with the distances between the selected cells and the end poles of the monobloc battery and possibly the distances between the selected cells, being chosen such that no voltages of more than about 30V occur between these areas in the intended operating conditions for the monobloc battery.

The area of the gas collecting line which has a lining composed of an electron-conductive material is at least partially located, for example, between the inlet openings of two adjacent cells and makes electrically conductive contact with the electrodes or with the electrolyte in one such cell.

The electron-conductive inner lining of the gas collecting line may comprise a tube or mesh tube whose material is a metal, a conductive plastic, or an insulator filled with conductive additives, preferably a plastic filled with conductive additives. An inner lining composed of lead or of a lead alloy is particularly suitable.

The lining may also be in the form of an electron-conductive frit or other open-pore porous material, which is composed of metal, a conductive plastic or an insulator filled with conductive additives, preferably a plastic filled with conductive additives.

It is also possible to insert an electron-conductive open-pore porous material, for example, a cabled cord, into the gas collecting line, with the material being a metal, a conductive plastic or an insulator filled with conductive additives, preferably a plastic filled with conductive additives. This cabled cord is preferably wound in a spiral shape. The electron-conductive, open-pore porous material makes electrical contact with the electrolyte or with one or more electrodes of one or more series-connected storage cells.

The cell areas of the electrochemical storage cells which are combined in the monobloc battery may be connected to the gas collecting line via nonreturn valves. The electrical resistance of the link between the conductive lining/frit/cabled cord and the electrodes or electrolyte is of such a magnitude that it is less than the resistance of the gas collecting line between two adjacent cells, assuming that they are completely filled with electrolyte.

Particularly in the case of the abovementioned monobloc batteries with a rated voltage of about 36V to about 40V, it is sufficient to provide an electrical link for the gas collecting line between two cells, approximately in the center of the series circuit to the electrodes or to the electrolyte. As a consequence, any voltage which may possibly occur in the gas collecting line is limited to a maximum of about half the block voltage. Since half the maximum envisaged operating voltage of about 58V is less than the critical voltage value of approximately 30V, the invention avoids the risk of detonation.

A single electrical link between the gas collecting line and the electrodes or the electrolyte in a cell is sufficient for this purpose in rechargeable batteries with a rated voltage of about 36 to about 40V. Even if a number of links are provided, there is considerable advantage in dispensing with electronic circuitry. In the case of monobloc batteries with higher rated voltages, a number of electrical links are required between the gas collecting line and the electrodes or electrolyte of series-connected cells, with the distance between these cells being chosen such that the voltage difference between them never exceeds about 30V during operation.

The electrical tap, which is utilized in accordance with aspects of the invention, for an electrode or for the electrolyte in a cell may at the same time be used for other purposes. This type of use of connections from the area which surrounds the electrodes and the electrolyte to the outer area for a number of different purposes, instead of a number of such connections, is advantageous especially from the manufacturing point of view and to save costs, since connections such as these are frequently subject to stringent requirements for sealing with respect to liquids (for example, electrolyte) and/or gases.

Other purposes such as these which may be mentioned include, in particular, methods for assessing the state of the monobloc battery, for example, the state of charge, the available performance, or aging, in which not only the overall voltage of a number of series-connected storage cells, but also the voltage on individual cells or groups of cells are used to assess the state. The uniformity of the voltages on the cells through which the same current flows is assessed in various operating states by means of intermediate taps on cells or cell groups. Methods such as these, and apparatuses which are suitable for carrying out the methods, can be found, by way of example, in the documents DE 19751987 A1 and DE 19810746 A1.

However, an electric tap which is provided for the purposes of the invention for an electrode may also be used at the same time for a switching element or protection element which is associated with the monobloc battery and, in particular, for a switching element or protection element which is integrated in it, and which can interrupt the current flow through the monobloc battery. To this end, two cells which are to be connected in series are not connected directly, but are connected via the switching or protection element. Electrical connections from the area surrounding the electrodes and the electrolyte to the outside area are also required for this purpose and, according to the invention, are used at the same time for the electronic link, as described in this invention, for the gas collecting line.

The described link may also be used to deliberately control the process of making the individual cells in the battery uniform. The electrical link between the conductive lining/frit/cabled cord and the electrodes or the electrolyte is then connected to a means which is associated with the monobloc battery, preferably to a means which is integrated in it, for example, a switching apparatus, and which unifies the state of the individual cells in the monobloc battery by an active application to this link of a current or of a voltage measured with respect to one of the end poles, or a further such link to the electrodes or to the electrolyte of another cell in the monobloc battery.

Methods for making the state of series-connected storage cells uniform are described, for example, in the thesis by Christoph Siedle, Karlsruhe University 1997 (VDI progress reports, series 21/Electrical Engineering, No. 245, VDI-Press Dusseldorf 1998), the subject matter of which is incorporated herein by reference. EP 0939 475 A2 discloses a method for making the state of two series-connected monobloc batteries uniform, the subject matter of which is incorporated herein by reference.

Turning now to the drawings, FIG. 1 shows a monobloc battery 1 according to the prior art with two end poles 6 and a single gas collecting line 3, which connects the degassing openings 2 of a number of cells to one another. Only one frit 4, located to avoid backflashes into the interior, is positioned at the single outlet point 5 to the environment. There is only one outlet 5, to which a flexible tube can be connected. If, however, the total number of the cells which are supplied from the single gas collecting line is sufficiently large that the voltage during operation may rise above about 30V (for example when 18 cells are connected in series), there is a risk of detonation when the interior of the gas collecting line is wetted with electrolyte. This risk is not dependent on the choice of the location of the outlet point 5 on the gas collecting line 3.

Figure 2:
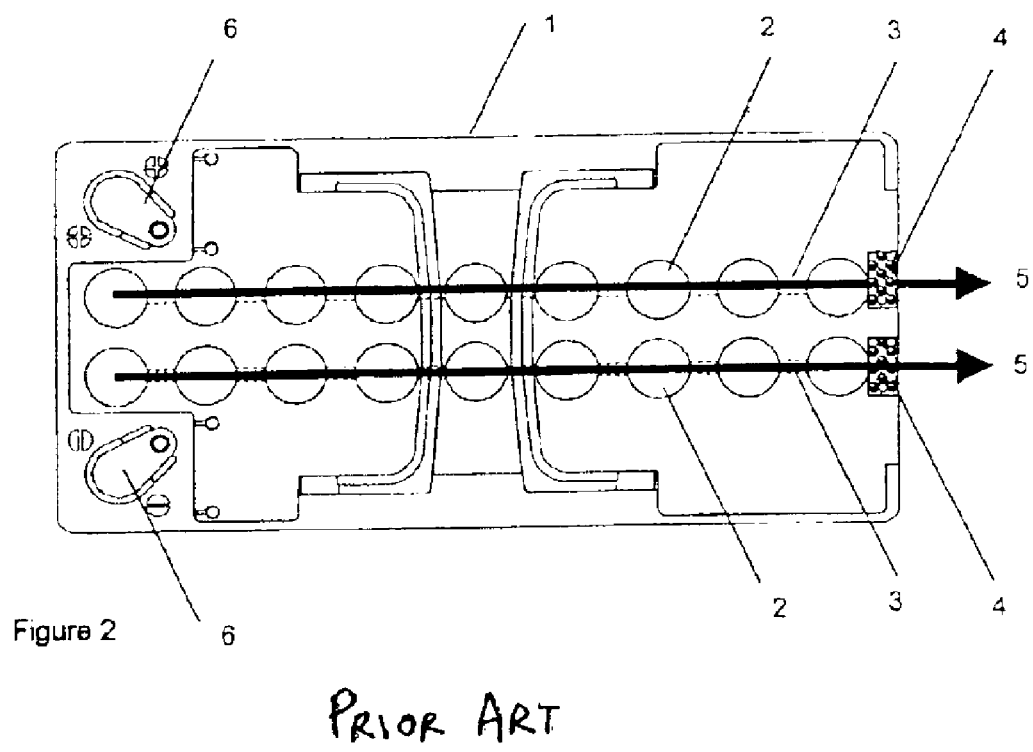

FIG. 2 shows a monobloc battery 1 according to the prior art with two separate gas collecting lines 3. One frit 4 to avoid backflashes into the interior is preferably located at each of the two outlet points 5 to the environment. If the voltage between the cells in each of the two parts of the monobloc batteries does not rise above about 30V during operation, as may be assumed, by way of example, in the case of in each case 9 lead-acid rechargeable battery cells in series, then there is no risk of detonation even if the interior of the gas collecting lines becomes wetted with electrolyte. Two frits 4 to restrict backflashes must be used in this case, and the two outlets 5 must remain strictly separated and must not be connected to a common flexible tube, in which an electrolyte bridge could be formed.

Figure 3:
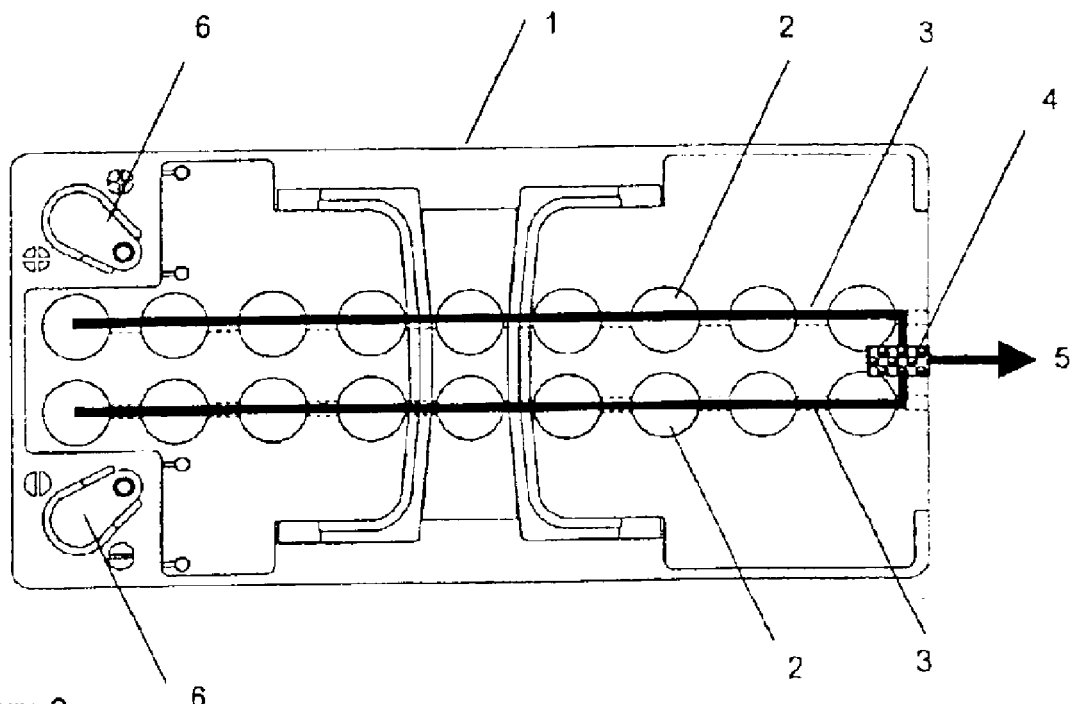
FIG. 3 shows, schematically, a top plan view of a monobloc battery in accordance with aspects of the invention.

FIG. 3 shows a configuration of a monobloc battery 1 according to aspects of the invention with a single gas collecting line 3. One frit 4, to avoid backflashes into the interior, is located at the single outlet point 5 to the environment. However, in contrast to FIG. 2, this is arranged such that it subdivides the gas collecting line 3 into two areas, and the total number of cells supplied is sufficiently small that the voltage in each case cannot rise above about 30V during operation. The frit 4 according to the invention is produced from conductive material and is electrically connected to the electrolyte or to an electrode of a cell which is arranged in the series circuit formed by the cells in a monobloc battery such that if their voltage during operation once again cannot in each case rise above about 30V with respect to an end pole or in respect to a further cell which is used in this way for electrical linking to the gas collecting line 3. There is, thus, no risk of detonation if the interior of the gas collecting line 3 is wetted with electrolyte.

Figure 4:
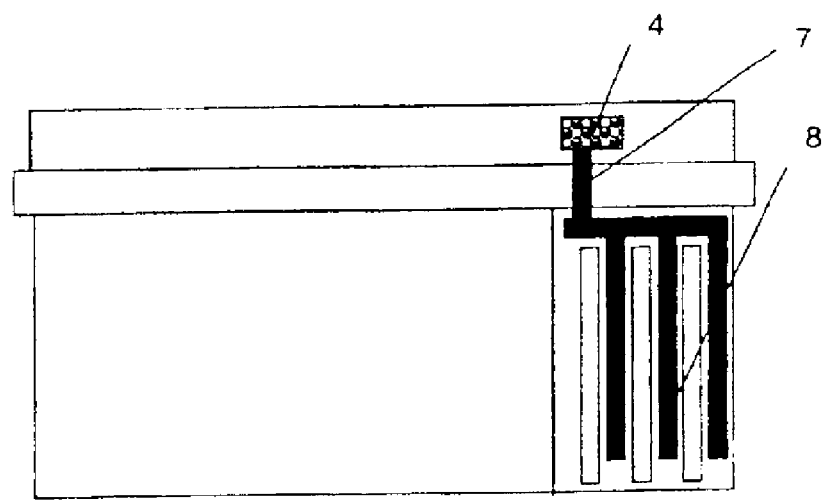
FIGS. 4 to 6 show, schematically, front elevational views of the electrical linking of the gas collecting line to electrodes or to the electrolyte in a cell.

FIG. 4 shows a cross section through the cover of a monobloc battery 1 at the point at which the electron-conductive frit 4, as illustrated in FIG. 3, is inserted into the gas collecting line 3. This is connected to the electrodes 8 of one polarity in an adjacent cell.

Figure 5:
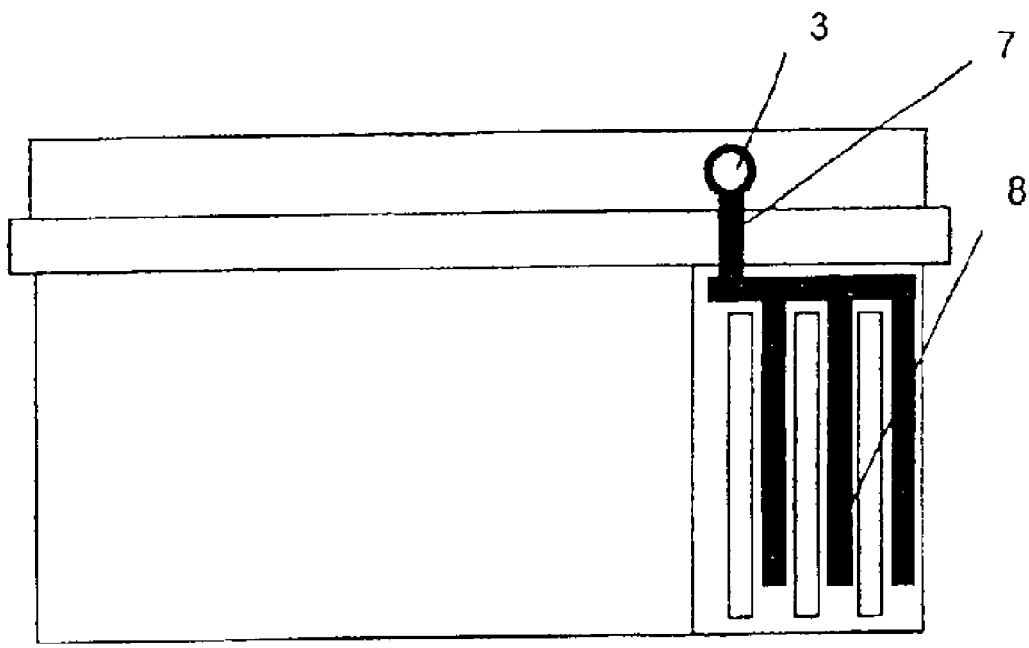

FIG. 5 shows a cross section through the cover of a monobloc battery 1 at the point which the gas collecting line 3 has the electron-conductive lining. This lining, which is composed for example of a lead ring, is connected to the electrodes 8 of one polarity in an adjacent cell.

Figure 6:
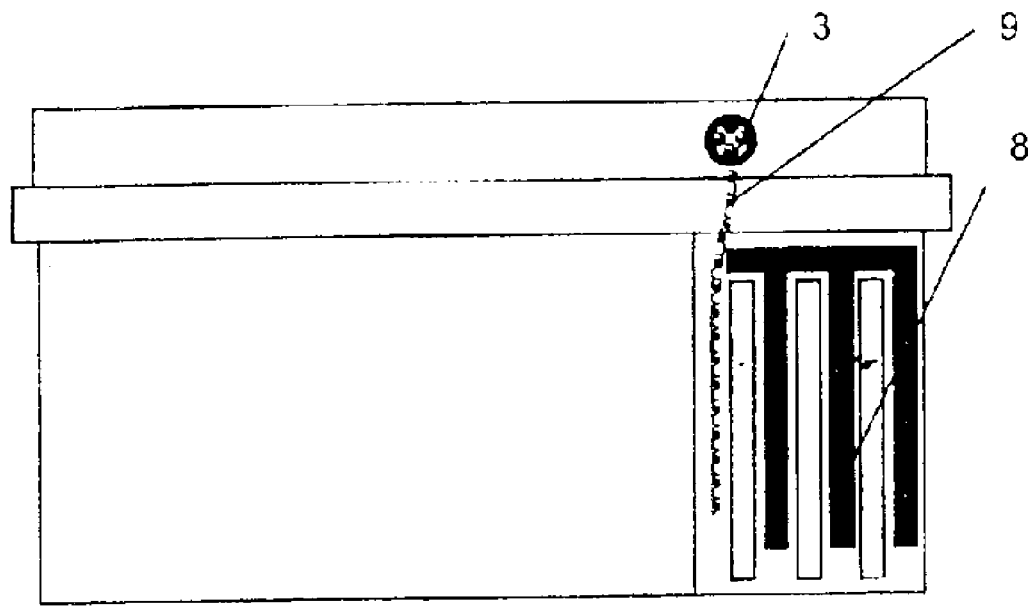

FIG. 6 shows a cross section through the cover of a monobloc battery 1 at the point at which a cabled cord 9 composed of electron-conductive material is inserted into the gas collecting line 3. This is connected to the electrolyte in an adjacent cell.

What is claimed is:

1. A monobloc battery comprising:
a plurality of interconnected electrochemical cells formed from electrodes and electrolyte and having end poles, wherein distances between selected ones of the cells and the end poles and, optionally, distances between the selected cells, are set such that no voltages of more than about 30V occur between the distances under normal operating conditions of the monobloc battery; and
at least one gas collecting line connected to selected ones of the cells and located to collect explosive gas mixtures, if any, generated by the cells, the gas collecting line being substantially electrically insulating and, in at least one area, having a lining composed of an electron-conductive material electrically conductively contacting the electrodes or the electrolyte in an individual cell.

2. The monobloc battery according to claim 1, wherein the area of the gas collecting line having a lining composed of an electron-conductive material is at least partially located between inlet openings of two adjacent cells, and is electrically conductively in contact with electrodes or with the electrolyte in one such cell.

3. The monobloc battery according to claim 1, wherein the inner lining comprises a tube or mesh tube composed of metal, conductive plastic or an insulator containing conductive additives.

4. The monobloc battery according to claim 3, wherein the electron-conductive inner lining is composed of lead or a lead alloy.

5. The monobloc battery according to claim 3, wherein the inner lining is a plastic containing conductive additives.

6. The monobloc battery according to claim 1, wherein the electron-conductive lining is an electron-conductive open-pore porous material.

7. The monobloc battery according to claim 6, wherein the electron-conductive lining is a frit.

8. The monobloc battery according to claim 7, wherein the cells are connected to the gas collecting line via a nonreturn valve.

9. The monobloc battery according to claim 7, wherein electrical resistance between the conductive lining and the electrodes or electrolyte is less than resistance of the gas collecting line between adjacent cells, under conditions that the cells are filled with electrolyte.

10. The monobloc battery according to claim 7, wherein an electrical link between the conductive lining and the electrodes or the electrolyte is connected to a switching or protection element associated with the monobloc battery and is capable of interrupting current flow through the monobloc battery.

11. The monobloc battery according to claim 7, wherein an electrical link between the conductive lining and the electrodes or electrolyte is connected to 1) a means for unifying the state of individual cells in the monobloc battery by active application of a current or of a voltage measured with respect to one of end poles in the battery to the link, or 2) a further link to the electrodes or to the electrolyte of another cell in the monobloc battery.

12. A battery assembly comprising:
a plurality of electrochemical cells or a plurality of monobloc batteries, each having a plurality of interconnected electrochemical cells; and
at least one gas collecting line connected to selected ones of the electrically interconnected cells and in which explosive gas mixtures generated by the cells may be located, wherein the gas collecting line is essentially electrically insulating and, in at least one portion, has a lining composed of an electron-conductive material electrically conductively in contact with electrodes or electrolyte in an individual cell, and wherein distances between selected cells and end poles of interconnected cells and, optionally, distances between the selected cells, are set such that no voltages of more than about 30V occur between the distances under intended operating conditions.

* * * * *